US010926372B2

(12) United States Patent
Nakayama et al.

(10) Patent No.: US 10,926,372 B2
(45) Date of Patent: Feb. 23, 2021

(54) AUTOMATIC POLISHING SYSTEM

(71) Applicant: Taikisha Ltd., Tokyo (JP)

(72) Inventors: Genji Nakayama, Tokyo (JP); Yoshio Higashi, Tokyo (JP); Yoshikazu Hayashi, Tokyo (JP); Hiroyuki Suzuki, Tokyo (JP); Shun Akimoto, Tokyo (JP); Yoshifumi Kawai, Tokyo (JP)

(73) Assignee: Taikisha Ltd., Tokyo (JP)

( * ) Notice: Subject to any disclaimer, the term of this patent is extended or adjusted under 35 U.S.C. 154(b) by 0 days.

(21) Appl. No.: 16/965,047

(22) PCT Filed: Dec. 20, 2019

(86) PCT No.: PCT/JP2019/050038
§ 371 (c)(1),
(2) Date: Jul. 27, 2020

(87) PCT Pub. No.: WO2020/158245
PCT Pub. Date: Aug. 6, 2020

(65) Prior Publication Data
US 2021/0016412 A1    Jan. 21, 2021

(30) Foreign Application Priority Data
Feb. 1, 2019    (JP) .............................. JP2019-016890

(51) Int. Cl.
*B24B 27/00*    (2006.01)
*B24B 49/12*    (2006.01)
(Continued)

(52) U.S. Cl.
CPC .......... *B24B 27/0076* (2013.01); *B24B 49/12* (2013.01); *B24B 55/06* (2013.01); *B25J 13/08* (2013.01); *B64F 5/40* (2017.01)

(58) Field of Classification Search
CPC ..... B24B 27/0076; B24B 49/12; B24B 55/06; B64F 5/40
(Continued)

(56) References Cited

U.S. PATENT DOCUMENTS 3,439,372 A * 4/1969 Collier .................. B66F 11/046
15/53.1
4,969,914 A * 11/1990 Ikegaya .................. B24B 7/241
451/160
(Continued)

FOREIGN PATENT DOCUMENTS

JP    S60175568 A    9/1985
JP    H07237106 A    9/1995
(Continued)

*Primary Examiner* — George B Nguyen
(74) *Attorney, Agent, or Firm* — The Webb Law Firm (57) ABSTRACT

Provided is an automatic polishing system that allows a polishing treatment of an article while circumventing a polishing averting portion of the article. A polisher is attached to a leading end portion of a movable arm of a work robot. A control device controls the work robot and the polisher, based on position information of a polishing target surface of an article, so that the polisher is moved along the polishing target surface by a movement of the work robot while providing a polishing action on the polishing target surface at the same time. An image of the article including an image of an area demarcation marker annexed to the article for demarcating the area of the polishing target surface is captured by a three-dimensional image capturing machine. The control device produces the position information of the polishing target surface by determining the position of the area demarcation marker based on image data of the image.

7 Claims, 6 Drawing Sheets

(51) Int. Cl.
*B24B 55/06* (2006.01)
*B25J 13/08* (2006.01)
*B64F 5/40* (2017.01)

(58) Field of Classification Search
USPC .......................................................... 451/6
See application file for complete search history.

(56) References Cited

U.S. PATENT DOCUMENTS

| | | | | |
|---|---|---|---|---|
| 5,462,243 A | * | 10/1995 | Hart | B64F 5/00 |
| | | | | 244/121 |
| 5,741,171 A | * | 4/1998 | Sarfaty | B24B 17/04 |
| | | | | 451/287 |
| 5,816,896 A | * | 10/1998 | Schouwenaars | B24B 9/16 |
| | | | | 451/41 |
| 5,964,645 A | * | 10/1999 | Jemt | B24B 7/182 |
| | | | | 451/354 |
| 7,316,604 B1 | * | 1/2008 | Burks | B24B 19/26 |
| | | | | 451/354 |
| 9,221,173 B2 | | 12/2015 | Iida | |
| 2013/0102227 A1 | | 4/2013 | Walsh et al. | |
| 2013/0130593 A1 | | 5/2013 | Kalenian et al. | |
| 2014/0134923 A1 | | 5/2014 | Brake et al. | |
| 2014/0134927 A1 | | 5/2014 | Walsh et al. | |
| 2018/0250833 A1 | * | 9/2018 | Boria | B64F 5/40 |
| 2020/0009705 A1 | | 1/2020 | Manabe et al. | |

FOREIGN PATENT DOCUMENTS

| | | |
|---|---|---|
| JP | H08016225 A | 1/1996 |
| JP | 2003039305 A | 2/2003 |
| JP | 2011011318 A | 1/2011 |
| JP | 2014200901 A | 10/2014 |
| JP | 2019005825 A | 1/2019 |
| TW | 201335983 A | 9/2013 |

* cited by examiner

AUTOMATIC POLISHING SYSTEM

CROSS-REFERENCE TO RELATED APPLICATIONS

This application is the United States national phase of International Application No. PCT/JP2019/050038 filed Dec. 20, 2019, and claims priority to Japanese Patent Application No. 2019-016890 filed Feb. 1, 2019, the disclosures of which are hereby incorporated by reference in their entirety.

TECHNICAL FIELD

The present invention relates to an automatic polishing system having a polisher, a work robot and a control device. The polisher is attached to a leading end portion of a movable arm of the work robot. The control device controls the work robot and the polisher, based on position information of a polishing target surface, so that the polisher is moved along the polishing target surface by a movement of the work robot while providing a polishing action on the polishing target surface at the same time.

BACKGROUND ART

Figure 8:
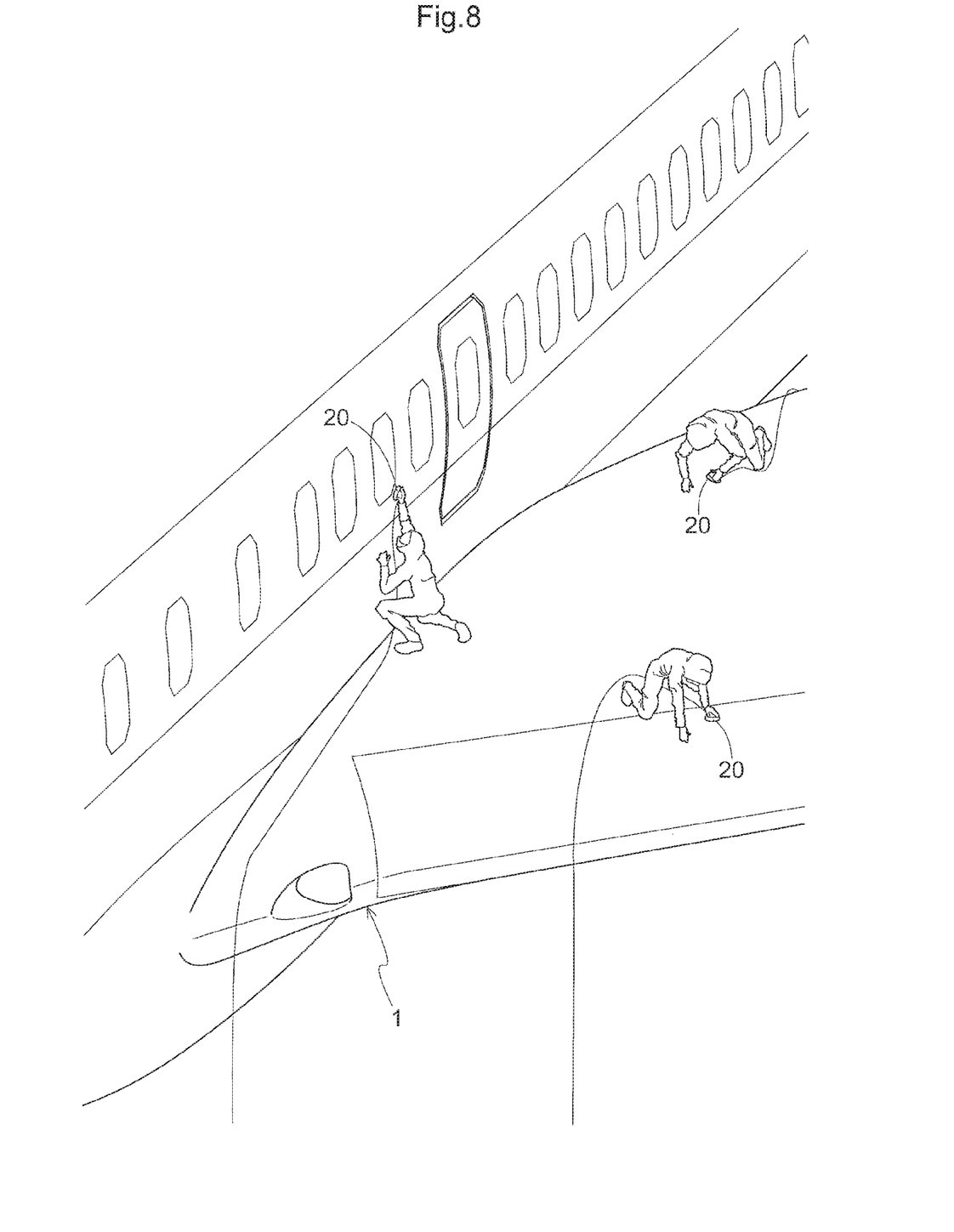
FIG. 8 is a perspective view showing a mode of work of a conventional polishing treatment work.

For example, when an article such as an aircraft or a railway car, etc. is to be repainted, subsequent to a peeling operation of removing old paint coat on the article surface, a polishing treatment is effected for polishing the article surface. Conventionally, this polishing treatment was done manually by a worker who holds a polisher 20 (sander), as shown in FIG. 8.

However, such polishing treatment is carried out in a working environment full of powder dust or the like generated from the polishing treatment. Thus, there was a risk of inviting health hazard to the worker. Further, if a large article such as an aircraft or a railway car, etc. is to be polished by a manual work, this will often force the worker to carry out the work under an uncomfortably forced posture, thus imposing significant physical stress to the worker.

For this reason, in recent years, there has been a need for development of an automatic polishing technique according to which a polisher is attached to a leading end portion of a movable arm of a work robot for carrying out a polishing treatment of an article by the work robot.

SUMMARY

Problem to be Solved by Invention

However, in order to cause a work robot to carry out a polishing treatment, three-dimensional shape (contour) data of a polishing target article is needed for controlling movements of the work robot and the polisher.

In order to obtain such three-dimensional shape data, it is firstly conceivable to utilize CAD data (three-dimensional designing data) of the article. However, such CAD data of an article is difficult to obtain because of such reason as confidentiality. Further, even if the CAD data of the article could be obtained, there will occur disagreement between the actual shape of the article and the CAD data if even a small deformation is present in the article resulting from its use, so utilization of the obtained CAD data is not possible in many cases.

On the other hand, in order to obtain three-dimensional shape data of the article, it is also conceivable to capture images of the article by a three-dimensional image capturing machine and then to utilize image data obtained thereby.

However, depending on the article, the article often includes some "polishing averting portion" (e.g. a sensor portion or a hinge portion of the aircraft, etc.) whose polishing treatment should be avoided. With the image data obtained by capturing images of the article by the three-dimensional image capturing machine, it is not possible to discern such polishing averting portion; and also it is difficult to utilize the images captured by the three-dimensional image capturing machine as three-dimensional shape data for controlling operations of the work robot and/or the polisher. These issues present significant obstacles in realizing the automatic polishing technique.

In view of the above-described state of the art, the principal object of the present invention is to provide an automatic polishing system that allows a polishing treatment of an article without using CAD data of the article and that allows also the polishing treatment on the article with reliably avoiding polishing of a polishing averting portion if any in the article.

Solution

A first characterizing feature of the present invention relates to an automatic polishing system, including a polisher, a work robot and a control device; the polisher is attached to a leading end portion of a movable arm of the work robot and the control device controls the work robot and the polisher, based on position information of a polishing target surface of an article, so that the polisher is moved along the polishing target surface by a movement of the work robot while providing a polishing action on the polishing target surface at the same time, the automatic polishing system comprising:

an area demarcation marker and a three-dimensional image capturing machine;

wherein an image of the article including an image of the area demarcation marker annexed to the article for demarcating the area of the polishing target surface is captured by the three-dimensional image capturing machine; and wherein the control device produces the position information of the polishing target surface by determining the position of the area demarcation marker based on image data of the image.

With the above-described arrangement, the control device produces the position information of the polishing target surface by determining the position of the area demarcation marker based on image data of the image; and then based on the position information thus produced, the control device controls the work robot and the polisher, thus causing the polisher to provide a polishing action on the polishing target surface.

Therefore, if a polishing averting portion is present in the article, when the area demarcation marker is to be provided to the article in such a manner as to demarcate the area of the polishing target surface, the worker will make sure of such polishing averting portion and annex this area demarcation marker in such a manner that the polishing averting portion is excluded from the area of the polishing target surface. With this, it is possible to reliably avoid inconvenience of the polishing averting portion being polished by the polisher inadvertently.

Further, the position information of the polishing target surface is produced from the image data obtained by image capturing by the three-dimensional image capturing machine, and then, based on this produced position information of the polishing target surface (here, position information corresponding also to the three-dimensional shape data of the polishing target surface), the work robot and the polisher are operated. Therefore, this is no need to obtain CAD data of the article, either.

And, by carrying out a polishing treatment of the article with using this automatic polishing system, it is possible to prevent the worker from being exposed to health hazard and/or physical load in the course of the polishing treatment of the article.

A second characterizing feature of the present invention specifies a preferred mode of embodying the first characterizing feature. According to this feature:

there are provided a self-propelled vehicle and a lift device;

the lift device is mounted on the self-propelled vehicle and the work robot is installed on a lift table of the lift device; and the control device controls movements of the self-propelled vehicle and the lift device based on the position information of the polishing target surface, thereby to move the work robot to an appropriate work position for the polishing target surface.

With this arrangement, by a traveling movement of the self-propelled vehicle and a lifting up/down movement of the lift device, the work robot is automatically moved to an appropriate work position for the polishing target surface. Thus, even for a large article such as an aircraft or a railway car, etc., a polishing treatment can be carried out in an efficient manner on each polishing target surface of the article.

A third characterizing feature of the present invention specifies a preferred mode of embodying the first or second characterizing feature. According to this feature:

as the image, a two-subject image capturing the area demarcation marker annexed to the article and either the self-propelled vehicle or the work robot is obtained by the three-dimensional image capturing machine; and based on image data of the two-subject image, the control device produces, as the position information, relative position information indicating relative positional relation between the polishing target surface and the work robot.

With this arrangement, based on the above-described relative position information, the work robot and the polisher are operated relative to the polishing target surface. Therefore, the system configuration can be simplified, in comparison with e.g. an arrangement of obtaining position information of the polishing target surface and position information of the self-propelled vehicle or the work robot separately.

A fourth characterizing feature of the present invention specifies a preferred mode of embodying any one of the first through third characterizing features. According to this feature:

at the leading end portion of the movable arm or the polisher, there is attached a distance sensor for determining a distance to the polishing target surface; and the control device controls operation of the work robot based on distance information outputted continuously from the distance sensor, thereby to move the polisher along the polishing target surface with keeping the distance constant.

With this arrangement, the polisher is moved along the polishing target surface, with keeping the distance between the distance sensor and the polishing target surface constant (in other words, keeping the distance between the main body of the polisher and the polishing target surface at a constant distance suitable for the polishing treatment of the polishing target surface) based on the distance information of the distance sensor. Thus, the polishing target surface can be polished uniformly. Consequently, the quality of the polishing treatment can be improved.

A fifth characterizing feature of the present invention specifies a preferred mode of embodying any one of the first through fourth characterizing features. According to this feature:

there is provided a followable expanding/contracting device; and the followable expanding/contracting device is configured to hold a polishing action end of the polisher with allowing followable displacement of the polishing action end in the direction perpendicular to the polishing target surface, in accordance with a reaction force received by the polishing action end from the polishing target surface.

With this arrangement, even when there exists a certain error between an uneven shape of the polishing target surface and a movement path of the polisher for its movement along the polishing target surface, thanks to the above-described followable displacement of the polishing action end in the direction perpendicular to the polishing target surface, it is possible to suppress change which may occur in the pressing force applied by the polishing action end to the polishing target surface due to such error. With this, the polishing target surface can be polished even more uniformly, and the polishing treatment quality can be further improved.

A sixth characterizing feature of the present invention specifies a preferred mode of embodying any one of the first through fifth characterizing features. According to this feature:

there is provided a followable swing device; and the followable swing device is configured to hold the polishing action end of the polisher with allowing followable swinging change of the polishing action end to a posture perpendicular to the polishing target surface, in accordance with a reaction force received by the polishing action end from the polishing target surface.

With this arrangement, even when there exists a certain error between an uneven shape of the polishing target surface and a movement path of the polisher for its movement along the polishing target surface, as the above-described followable swinging change of the polishing action end is allowed, the perpendicular posture of the polishing action end relative to the polishing target surface can be maintained in spite of the error. With this, the polishing target surface can be polished even more uniformly, and the polishing treatment quality can be further improved.

EMBODIMENT

Figure 1:
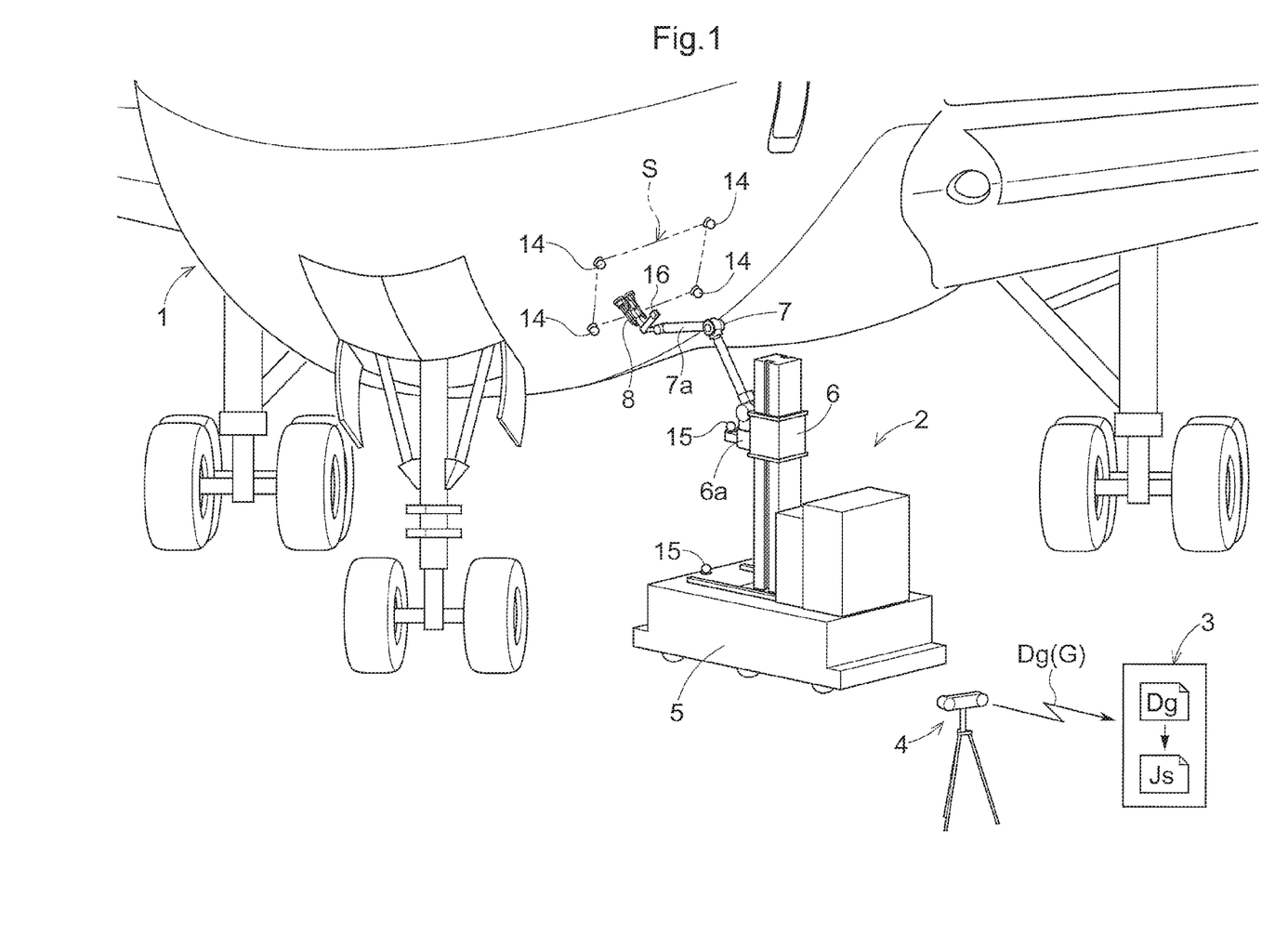
FIG. 1 is a perspective view showing a general configuration of an automatic polishing system.

FIG. 1 shows a general configuration of an automatic polishing system, in which a machine body outer surface of an aircraft 1 as a treatment target is under a condition in which old paint coat has been removed by a peeling treatment prior to a repainting treatment.

In a storage house (a hangar) accommodating the aircraft 1 as the treatment target, there are disposed a work machine 2, a control device 3 and a three-dimensional image capturing device 4.

The work machine 2 includes a self-propelled vehicle 5, a lift device 6 and a work robot 7. The lift device 6 is mounted on the self-propelled vehicle 5 and the lift device 6 is arranged to be slidable relative to the self-propelled vehicle 5 along the front/rear direction of this self-propelled vehicle 5.

The work robot 7 is installed on a lift table 6a of the lift device 6 and at the leading end portion of an articulated type movable arm 7a of the work robot 7, a polisher 8 is attached.

Figure 2:
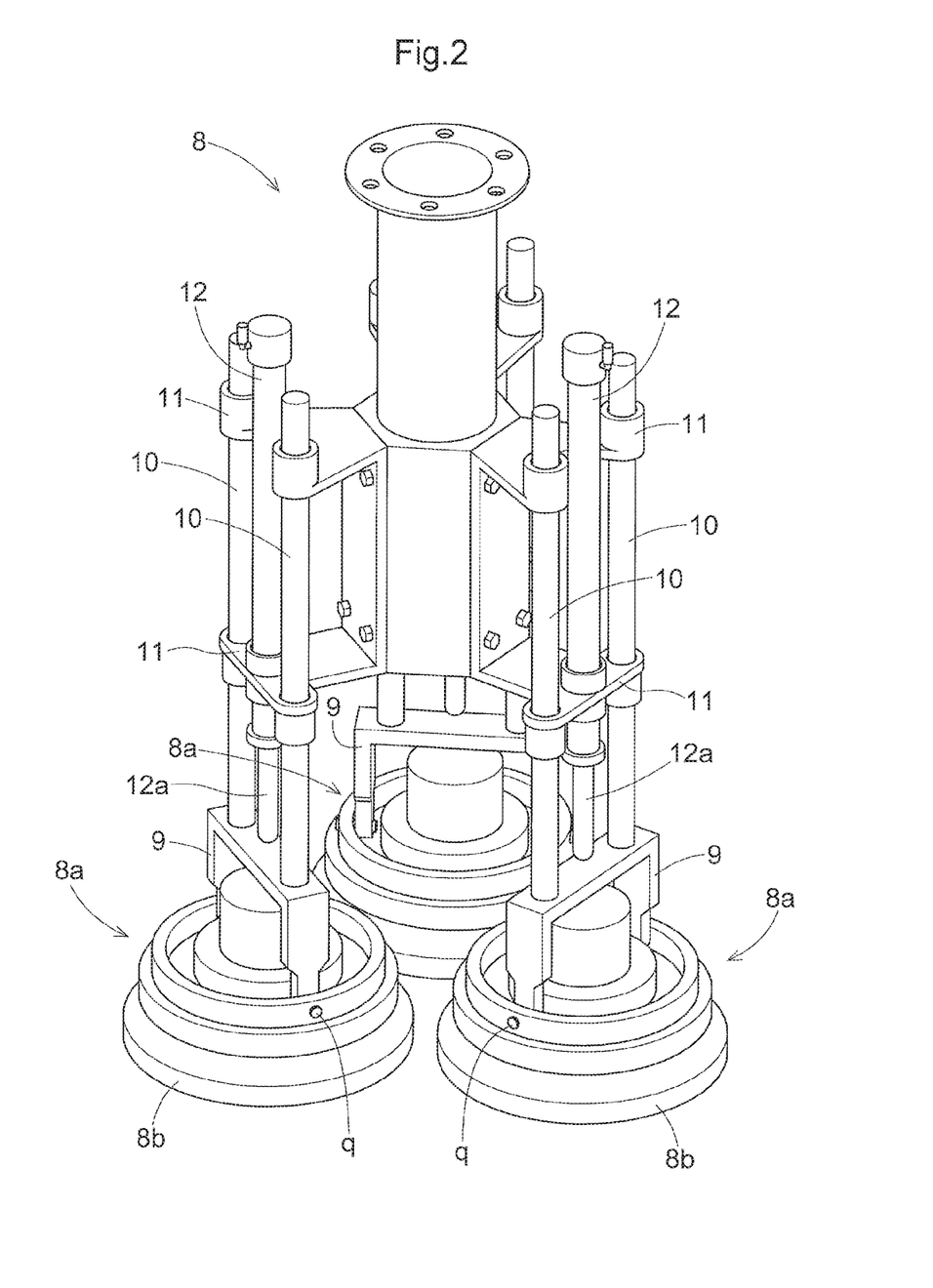
FIG. 2 is a perspective view showing a polisher mounted to a work robot.

At the leading end of the polisher 8, there are mounted three polishing rotor portions 8a. These three polishing rotor portions 8a are disposed in juxtaposition and located at respective vertices of an equilateral triangle as shown in FIG. 2. Each polishing rotor portion 8a includes a polishing motor 8b constituting a "polishing action end" for a polishing target surface S.

To the back face side of each polishing rotor portion 8a, there is attached a portal-shaped frame 9. To this portal-shaped frame 9, two support rods 10 are coupled under a parallel posture. Each support rod 10 is held by a support holder 11 mounted to a frame portion of the polisher 8 to be slidable along the longitudinal direction of the support rod 10.

Namely, each polishing rotor portion 8a is provided in the polisher 8 to be movable parallel with the longitudinal direction of the support rod 10 (in other words, the direction perpendicular to the polishing target surface S).

Further, to the portal-shaped frame 9, there are operably coupled piston rods 12a of pneumatic cylinders 12 which are attached to the frame portion of the polisher 8.

Each pneumatic cylinder 12 constitutes a "followable expanding/contracting device" configured to hold the polishing rotor portion 8a, with allowing followable displacement of this polishing rotor portion 8a to the direction perpendicular to the polishing target surface S in accordance with a reaction force received by the polishing rotor portion 8a from the polishing target surface S.

Namely, when the reaction force from the polishing target surface S increases, the piston rod 12a of the pneumatic cylinder 12 is contracted, thus causing followable displacement of the polishing rotor portion 8a to the side away from the polishing target surface S. Conversely, when the reaction force from the polishing target surface S decreases, the piston rod 12a of the pneumatic cylinder 12 is expanded, thus causing followable displacement of the polishing rotor portion 8a to the side closer to the polishing target surface S.

Figure 3:
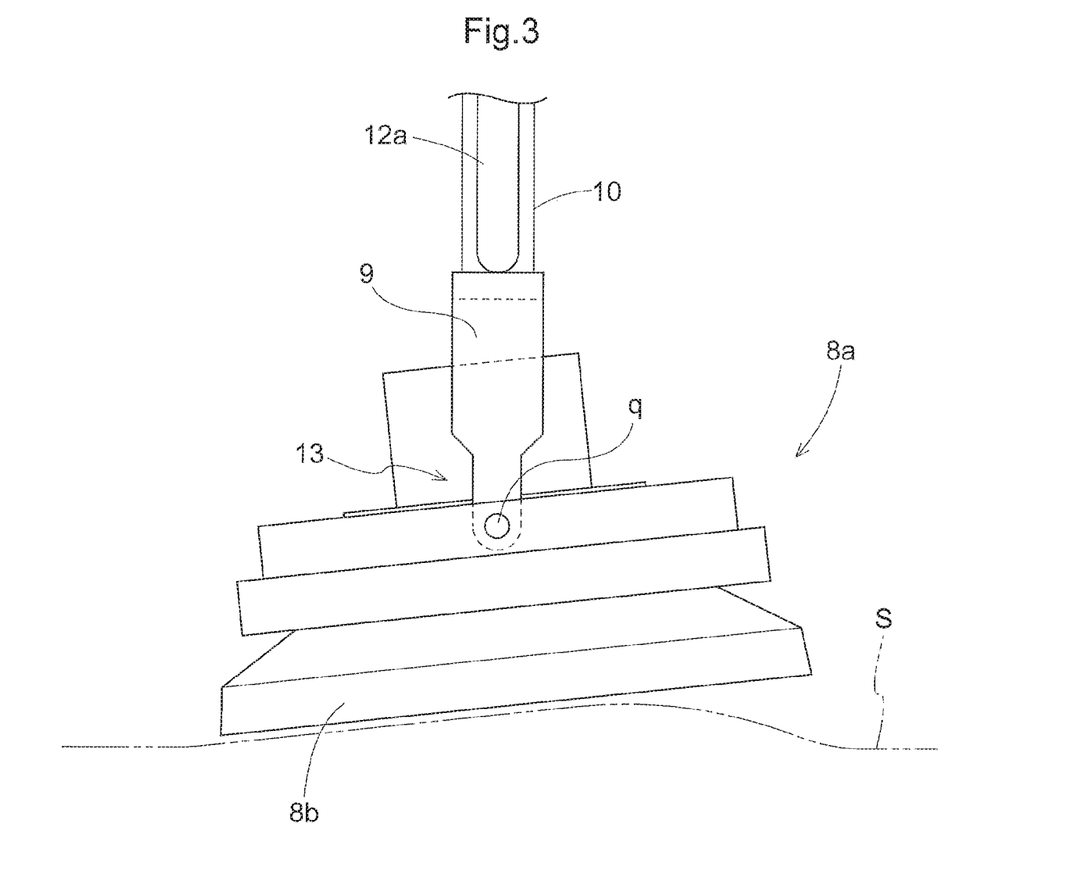
FIG. 3 is a side view showing a followable swinging change of a polishing action end of the polisher.

The polishing rotor portion 8a, as shown in FIG. 3, is coupled to the portal-shaped frame 9 to be pivotable (swingable) about an axis (q) orthogonal to the longitudinal direction of the support rod 10. This pivotal arrangement 13 constitutes a "followable swing device" configured to hold the polishing rotor portion 8a with allowing followable swinging change of the polishing rotor portion 8a to a posture perpendicular to the polishing target surface S, in accordance with a reaction force received from the polishing target surface S.

Namely, the polishing rotor portion 8a, as being pivoted about the axis (q) in accordance with a reaction force from the polishing target surface S, effects a followable swinging change (in other words, a followable posture change) to a posture perpendicular to the polishing target surface S, in accordance with a reaction force received from the polishing target surface S.

Figure 4:
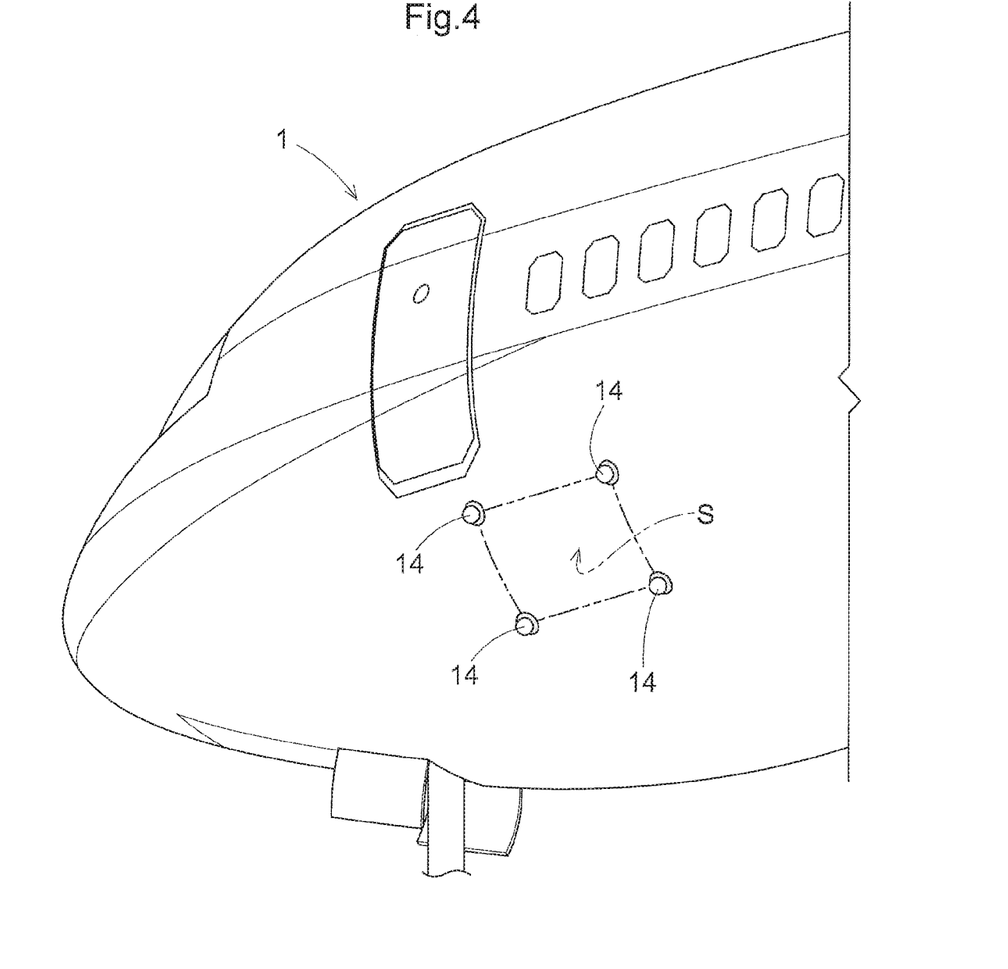
FIG. 4 is a perspective view showing an annexed state of an area demarcation marker.
Figure 5:
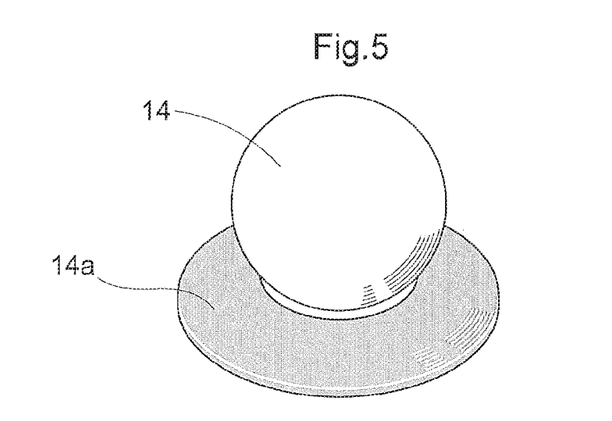
FIG. 5 is a perspective view of the area demarcation marker.

FIG. 4 shows an annexed state of area demarcation markers 14 to the machine body outer surface of the aircraft 1. Each area demarcation marker 14, as shown in FIG. 5, includes a sticking seat 14a for sticking the area demarcation marker 14 constituted of a spherical reflector to the machine outer surface of the aircraft 1.

The area demarcation markers 14, by a worker's manual operation, will be stuck at four corners of a polishing planned area on the machine body outer surface of the aircraft 1, as shown in FIG. 4 and FIG. 1. With these stuck four area demarcation markers 14, a rectangular polishing target surface S is set on the machine body outer surface of the aircraft 1.

Incidentally, in the sticking operations of the area demarcation markers 14, these sticking operations of the area demarcation markers 14 can be assisted by e.g. projecting, by means of a laser pointer or the like, the movable range of the work robot 7 onto the machine body outer surface of the aircraft 1.

In the sticking operations of the area demarcation markers 14 (in other words, the demarcating operation of the polishing target surface S), the worker will make sure of any polishing avert portion such as a sensor portion if any in the machine body outer surface of the aircraft 1. Then, after and based on this confirmation, the four area demarcation markers 14 may be stuck to the machine body outer surface of the aircraft 1 such that the polishing target surface S will be set to circumvent the polishing avert portion and the polishing avert portion may be located off the polishing target surface S.

The work machine 2 will be moved by traveling of the self-propelled vehicle 5 to its initial position near the machine body portion of the aircraft 1 where the polishing target surface S is set. This traveling operation of the self-propelled vehicle 1 may be carried out manually by a worker or automatically by the control device 3.

The three-dimensional image capturing machine 4 is installed at position capable of capturing images of both the work machine 2 moved to the initial position and the machine body portion annexed with the area demarcation markers 14. And, by the three-dimensional image capturing machine 4 installed at such position, a two-subject image G is obtained which includes both an image of the machine body portion annexed with the area demarcation markers 14 and an image of the work machine 2.

Image data (Dg) of the two-subject image G captured by the three-dimensional image capturing machine 4 is transmitted from this three-dimensional image capturing machine 4 to the control device 3. Then, the control device 3 executes following control operations (a) through (e), based on this image data Dg of the two-subject image G transmitted from the three-dimensional image capturing machine 4.

(a) By analyzing the image data Dg of the two-subject image G, the positions of the four area demarcation markers 14 annexed to the aircraft 1, as well as the position of an origin marker 15 attached (annexed) to e.g. the self-propelled vehicle 5 of the work machine 2 are determined. Then, based on the result of this determination, there is produced "relative position information" Js indicative of relative positional relation (including the postures and orientations respectively of the polishing target surface S and the work machine 2) between the rectangular polishing target surface S set on the machine body outer surface of the aircraft 1 and the work machine 2 located at the initial position.

Incidentally, in the instant embodiment, on the work machine 2, there are attached (annexed) a plurality of such origin markers 15 in distribution on respective portions of the work machine 2. With this arrangement, through the analysis of the image data Dg of the two-subject image G, the control device 3 determine the orientation of the work machine 2 from the relative position relations among the plurality of origin markers 15, in addition to and similarly to the determination of the posture of the polishing target surface S from the relative position relations among the four area demarcation markers 14.

Namely, this relative position information Js indicates the position of the polishing target surface S set on the machine body outer surface of the aircraft 1, by identifying three-dimensional coordinate values of each one of the four area demarcation markers 14 annexed to the aircraft 1, on a three-dimensional coordinate system including the initial position of the work machine 2 as the origin thereof.

(b) Based on the relative position information Js produced as above, the self-propelled vehicle 5 and the lift device 6 are controlled, so that by a traveling movement of the self-propelled vehicle 5 from the initial position as well as a lifting up/down movement and a sliding movement of the lift device 6, the work robot 7 installed on the lift table 6a of the lift device 6 is moved to an optimal work position relative to the polishing target surface S.

Figure 6:
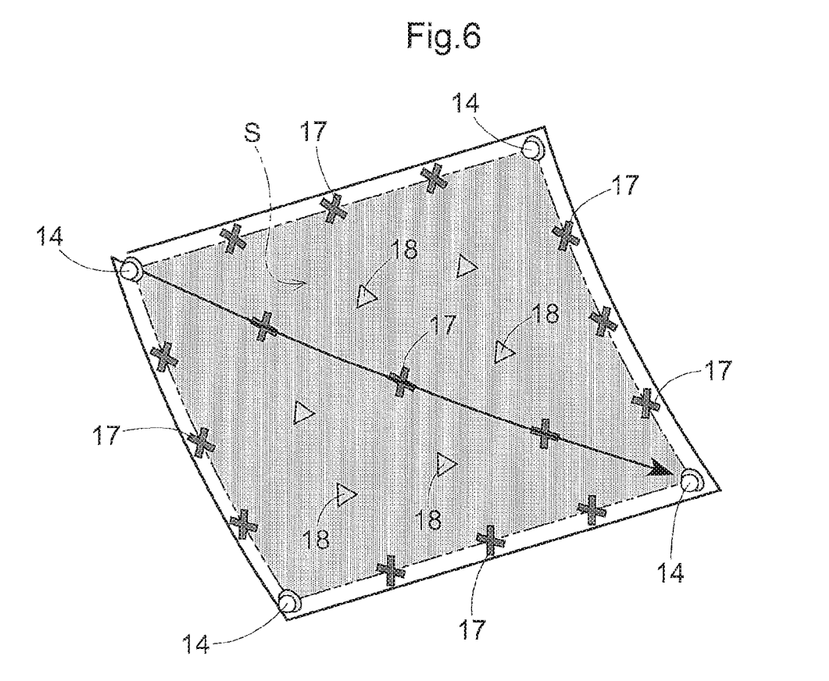
FIG. 6 is a perspective view for explaining a mode of determining a surface shape (contour)

(c) Then, the work robot 7 which has been moved to the optimal work position is controlled based on the relative position information Js (namely, the position information of the polishing target surface S). With this, while the polishing rotors 8b thereof are kept under stopped states, the polisher 2 will be scan-moved by movements of the work robot 7, in one-stroke manner along the respective sides and one diagonal line of the polishing target surface S, as indicated by arrows in FIG. 6.

And, in association with this scanning movement, by means of a distance sensor 16 attached to the leading end of the movable arm 7a together with the polisher 2, the distance between this distance sensor 16 and the polishing target surface S is determined at each one of a plurality of auxiliary points 17 (denoted with X signs in FIG. 6) on the polishing target surface S. Then, based on the result of this determination and the relative position information Js, position information (the three-dimensional coordinate values in the three-dimensional coordinate system described above) of each one of the plurality of auxiliary points 17 is produced.

Further, based on the position information of these auxiliary points 17 and the relative position information Js, position information (the three-dimensional coordinate values in the three-dimensional coordinate system described above) of each one of a plurality of inner auxiliary points 18 (denoted with white triangular signs in FIG. 6) on the polishing target surface S are calculated.

Figure 7:
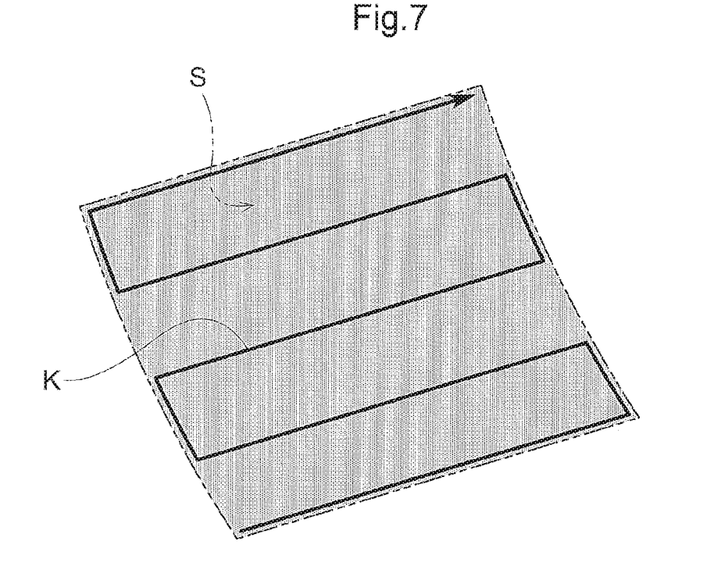
FIG. 7 is a perspective view for explaining a polishing movement path.

(d) Subsequent to the production of the position information of these auxiliary points 17 and inner auxiliary points 18, based on the relative position information Js and the position information of the respective auxiliary points 17 and the inner auxiliary points 18, the polisher 8 is caused to effect a meandering movement over the entire area of the polishing target surface S with a meandering width corresponding to the width of the polishing target surface, thus setting a polishing movement path K as shown in FIG. 7.

(e) Thereafter, as movements of the work robot 7 and the polisher 8 are controlled based on the set polishing movement path K, while causing the polishing rotors 8b of the polisher 8 to provide polishing actions on the polishing target surface S, the polisher 8 is moved along the polishing movement path K on the polishing target surface S, by movements of the work robot 7, whereby the entire area of the polishing target surface S will be polished.

In the process of causing the polisher 8 to be moved along the polishing movement path K, the distance between the distance sensor 16 and the polishing target surface S is determined continuously by the distance sensor 16, and then based on the determination information of the distance sensor 16, the movement control for the work robot 7 is corrected, whereby the distance between the polisher 8 and the polishing target surface S is kept suitable for the polishing treatment.

Incidentally, in this example, for correction of the movement control of the work robot 7 based on the determination information of the distance sensor 16, specifically, the relative position information Js and the position information of the respective auxiliary points 17 and the inner auxiliary points 18 are corrected based on the determination information of the distance sensor 16.

Further, in the course of the movement of the polisher 8 along the polishing movement path K, by expanding/contracting functions of the pneumatic cylinders 12 as the followable expanding/contracting devices described above, in accordance with a reaction force received by the polishing rotor 8a of the polisher 8 from the polishing target surface S, the polishing rotor 8a will effect a followable displacement in the direction perpendicular to the polishing target surface S.

Moreover, by the function of the pivotal arrangement 13 of the polishing rotor 8a as the followable swinging device described above, in accordance with the reaction force received by the polishing rotor portion 8a of the polisher 8 from the polishing target surface, the polishing rotor portion 8a will effect a followable swinging change (posture) change to a posture perpendicular to the polishing target surface S.

Namely, even if there exists a certain error in the setting of the polishing movement path K relative to the actual surface shape of the polishing target surface S, thanks to the optimization of the distance between the polisher 8 and the polishing target surface S, the followable displacement of the polishing rotor portion 8a by the pneumatic cylinder 12 and the followable swinging change of the polishing rotor portion 8a by the pivotal arrangement 13, the polishing target surface S can be polished uniformly.

By the above-described control operations (a) through (e), after completion of the polishing treatment on one polishing target surface S, with confirming any polishing avert portion by a manual operation of the worker, the area demarcation markers 14 will be annexed or attached at four corners of the next polishing planned portion on the machine body outer surface of the aircraft 1. With these, a next polishing target surface S will be set on the machine body outer surface of the aircraft 1.

Further, the work machine 2 will be moved to a next initial position near the machine body portion where the next polishing target surface S has been set on the aircraft 1 and the three-dimensional image capturing machine 4 will be moved, and a next two-subject image G will be obtained by this moved three-dimensional image capturing machine 4.

And, as the control device 3 executes the above described control operations (a) through (e) based on image data DG of this two-subject image G, the new polishing target surface S will be polished. Thereafter, with repetition of the same operational process above, substantially entire machine body outer surface of the aircraft 1 will be automatically polished by the work robot 7.

Incidentally, on each polishing target surface S, the relative position information adjusted based on the determination information of the distance sensor 16 as well as position relating information of the polishing target surface S specified by the position information of the auxiliary points 17 and the inner auxiliary points 18 will be stored in the control device 3 after completion of the polishing treatment of the polishing target surface S. And, such stored position relating information will be utilized for automatic production of a motion control program for the work robot when a similar work robot will be used for automatic painting of the polished polishing target surface S (i.e. a repainting target surface).

Also, the work machine 2 may mount a dust collector, so that dust generated by the polishing work may be collected by this mounted dust collector.

[Other Embodiments]

Next, other embodiments of the present invention will be described one after another.

In the foregoing embodiment, the two-subject image G including images of the area demarcation markers annexed to the outer surface of the aircraft 1 and images of the origin markers 15 annexed to the work machine 2 are captured by the three-dimensional image capturing machine 4. Instead of this, an image G capturing the area demarcation markers 14 annexed to the machine body outer surface of the aircraft 1 is captured by the three-dimensional image capturing machine 14 mounted on the work machine 2 or the work robot 7. And, based on image data Dg of this image G, the control device 3 may produce position information of the polishing target surface S.

The area demarcation marker 14 is not limited to the spherical reflector disclosed in the foregoing embodiment, but may be any other member or object such as a seal-like marker or a medal-like marker, or a light beam spot projected by a laser pointer or the like, which can be recognized in the image G captured by the three-dimensional image capturing machine 4.

Further, in case the origin marker 15 is attached to the work machine 2, the origin marker 15 may be attached to any portion of the work machine 2, such as on the self-propelled vehicle 5, the lift device 8, the work robot 7, etc.

In the foregoing embodiment, there was disclosed an example in which four area demarcation markers 14 are used for setting the rectangular polishing target surface S. Alternatively, a triangular polishing target surface S may be set by using three area demarcation markers 14. Or, a pentagonal polishing target surface S may be set by using five area demarcation markers 14. In this way, the number of the area demarcation markers 14 to be used and the shape (contour) of the polishing target surface S to be set can vary as desired.

Also, by annexing a single area demarcation marker 14 at the center portion of the polishing planned portion, the control device 3 can recognize a predetermined area around the annexed area demarcation marker 14 as the polishing target surface S.

In the foregoing embodiment, there was disclosed an example in which an aircraft 1 was used as an article as a polishing target. However, the article as a polishing target is not limited to an aircraft, but may be any other object such as a railway car, a ship, an automobile body, a building, etc.

Further, the purpose of polishing is not limited to surface treatment for a repainting treatment, but may be a polishing treatment for any other purpose, such as a polishing of an article, a removing treatment of old paint coat, etc.

INDUSTRIAL APPLICABILITY

The present invention can be used for carrying out a polishing treatment of various kinds of article for a variety of purposes.

DESCRIPTION OF SIGNS

8: polisher
7: work robot
3: control device
7a: movable arm
1: aircraft (article)
S: polishing target surface
Js: relative position information (position information)
14: area demarcation marker
4: three-dimensional image capturing machine
G: two-subject image (image)
Dg: image data
5: self-propelled vehicle
6: lift device
6a: lift table
16: distance sensor
8b: polishing rotor (polishing action end)
12: pneumatic cylinder (followable expanding/contracting device)
13: pivotal arrangement (followable swing device)

The invention claimed is:

1. An automatic polishing system, including a polisher, a work robot and a control device;
    the polisher being attached to a leading end portion of a movable arm of the work robot;
    the control device controlling the work robot and the polisher, based on position information of a polishing target surface of an article, so that the polisher is moved along the polishing target surface by a movement of the work robot while providing a polishing action on the polishing target surface at the same time;
    the automatic polishing system comprising an area demarcation marker, a three-dimensional image capturing machine and a distance sensor;
    wherein an image of the article including an image of the area demarcation marker annexed to the article for demarcating the area of the polishing target surface is captured by the three-dimensional image capturing machine;
    wherein the distance sensor is attached to the leading end portion of the movable arm or the polisher and configured to determine a distance to the polishing target surface;
    wherein the control device produces the position information of the polishing target surface by determining the position of the area demarcation marker based on image data of the image;
    wherein based on the produced position information of the polishing target surface, the control device controls the work robot, thereby to cause the work robot to effect a scanning-movement along the polishing target surface with placing the polisher under a non-polishing action state and produces position information of a plurality of auxiliary points on the polishing target surface, based on determination information of the distance sensor and the position information of the polishing target surface, in association with the scanning-movement;

wherein based on the produced position information of the auxiliary points and the produced position information of the polishing target surface, the control device sets a polishing movement path along which the polisher is caused to move along the polishing target surface entirely under a polishing action state; and wherein the control device controls movements of the work robot and the polisher based on the set polishing movement path, so that the polisher provides a polishing action on the polishing target surface, while with a movement of the work robot, the polisher is moved along the polishing movement path on the polishing target surface.

2. The automatic polishing system of claim 1, wherein:

in setting the polishing movement path based on the position information of the auxiliary points and the position information of the polishing target surface;

the control device calculates position information of a plurality of inner auxiliary points respectively on the polishing target surface, based on the position information of the auxiliary points and the position information of the polishing target surface; and the control device sets the polishing movement path, based on the calculated position information of the inner auxiliary points, the position information of the auxiliary points and the position information of the polishing target surface.

3. The automatic polishing system of claim 1, wherein:

there are provided a self-propelled vehicle and a lift device;

the lift device is mounted on the self-propelled vehicle and the work robot is installed on a lift table of the lift device; and the control device controls movements of the self-propelled vehicle and the lift device based on the position information of the polishing target surface, thereby to move the work robot to an appropriate work position for the polishing target surface.

4. The automatic polishing system of claim 1, wherein:

as the image, a two-subject image capturing the area demarcation marker annexed to the article and either the self-propelled vehicle or the work robot is obtained by the three-dimensional image capturing machine; and based on image data of the two-subject image, the control device produces, as the position information, relative position information indicating relative positional relation between the polishing target surface and the work robot.

5. The automatic polishing system of claim 1, wherein:

the control device, in the process of causing the polisher to move along the polishing movement path, controls the movement of the work robot based on determination information continuously outputted from the distance sensor, thereby to cause the polisher to move along the polishing target surface with keeping the distant constant.

6. The automatic polishing system of claim 1, wherein:

there is provided a followable expanding/contracting device; and the followable expanding/contracting device is configured to hold a polishing action end of the polisher with allowing followable displacement of the polishing action end in the direction perpendicular to the polishing target surface, in accordance with a reaction force received by the polishing action end from the polishing target surface.

7. The automatic polishing system of claim 1, wherein:

there is provided a followable swing device; and the followable swing device is configured to hold the polishing action end of the polisher with allowing followable swinging change of the polishing action end to a posture perpendicular to the polishing target surface, in accordance with a reaction force received by the polishing action end from the polishing target surface.

* * * * *